United States Patent
Crosbie

(10) Patent No.: US 7,146,636 B2
(45) Date of Patent: Dec. 5, 2006

(54) METHOD AND SYSTEM FOR ENABLING CENTRALIZED CONTROL OF WIRELESS LOCAL AREA NETWORKS

(75) Inventor: David B. Crosbie, Somerville, MA (US)

(73) Assignee: Bluesocket, Inc., Burlington, MA (US)

( * ) Notice: Subject to any disclaimer, the term of this patent is extended or adjusted under 35 U.S.C. 154(b) by 1005 days.

(21) Appl. No.: 10/035,569

(22) Filed: Oct. 22, 2001

(65) Prior Publication Data

US 2002/0085719 A1 Jul. 4, 2002

Related U.S. Application Data

(63) Continuation-in-part of application No. 09/911,092, filed on Jul. 23, 2001.

(60) Provisional application No. 60/241,975, filed on Oct. 23, 2000, provisional application No. 60/220,385, filed on Jul. 24, 2000.

(51) Int. Cl.
*G06F 9/00* (2006.01)
*G06F 11/00* (2006.01)

(52) U.S. Cl. ............... 726/7; 726/19; 726/15; 726/14; 726/13; 726/12; 710/37

(58) Field of Classification Search ............... 726/17, 726/8, 5, 26, 22, 25, 11–15
See application file for complete search history.

(56) References Cited

U.S. PATENT DOCUMENTS

| | | | |
|---|---|---|---|
| 5,423,065 A | 6/1995 | Pinard | 455/33.2 |
| 5,448,570 A | 9/1995 | Toda et al. | 370/95.3 |
| 5,809,415 A | 9/1998 | Rossmann | 455/422 |
| 5,901,144 A | 5/1999 | Maki et al. | 370/330 |
| 5,940,591 A | 8/1999 | Boyle et al. | 395/187.01 |
| 5,987,062 A | 11/1999 | Engwer et al. | 375/225 |
| 6,014,558 A | 1/2000 | Thomas | 455/410 |
| 6,018,657 A | 1/2000 | Kennedy, III et al. | 455/426 |
| 6,026,297 A | 2/2000 | Haartsen | 455/426 |

(Continued)

FOREIGN PATENT DOCUMENTS

EP     0 903 873 A1    3/1999

(Continued)

OTHER PUBLICATIONS

Berger, S., et al., "Pervasive Networking Using Bluetooth: A Status Report and Future Plans," Presentation Slides and Paper (21 pgs.) *IBM Watson Research Center*: (1999).

(Continued)

*Primary Examiner*—Norman M. Wright
(74) *Attorney, Agent, or Firm*—Goodwin Procter LLP

(57) ABSTRACT

A wireless local area network (WLAN) includes mobile devices that are allowed to transfer wireless connections between WLAN subnets or channels having different access points. The access points connect to a central controller or roaming server that supports seamless hand-offs of mobile devices from one access point to another access point. The roaming server supports the reassignment of session data parameters from one access point to another (e.g., access point address spoofing) so that the mobile device can use the same parameters for communicating to a new access point. The roaming server also supports the seamless handoff of a mobile device from one access point to another by using a master-slave switch technique across two piconets. The roaming server also facilitates the control of access points by establishing a host controller interface and wireless protocol stack in the roaming server and another, complementary wireless protocol stack in the access point. The roaming server then encapsulates host controller commands in a packet based network protocol used for communication between the roaming server and the access points.

30 Claims, 9 Drawing Sheets

U.S. PATENT DOCUMENTS

| | | | | |
|---|---|---|---|---|
| 6,038,458 | A | 3/2000 | Siira | 455/560 |
| 6,081,900 | A | 6/2000 | Subramaniam et al. | 713/201 |
| 6,115,615 | A | 9/2000 | Ota et al. | 455/553 |
| 6,134,591 | A | 10/2000 | Nickles | 709/229 |
| 6,137,791 | A | 10/2000 | Frid et al. | 370/352 |
| 6,157,834 | A * | 12/2000 | Helm et al. | 455/436 |
| 6,172,986 | B1 | 1/2001 | Watanuki et al. | 370/466 |
| 6,195,705 | B1 | 2/2001 | Leung | 709/245 |
| 6,243,581 | B1 | 6/2001 | Jawanda | 455/432 |
| 6,377,548 | B1 | 4/2002 | Chuah | 370/233 |
| 6,427,174 | B1 | 7/2002 | Sitaraman et al. | 709/245 |
| 6,452,910 | B1 * | 9/2002 | Vij et al. | 370/310 |
| 6,493,749 | B1 | 12/2002 | Paxhia et al. | 709/220 |
| 6,633,761 | B1 | 10/2003 | Singhal et al. | 455/436 |
| 6,744,753 | B1 * | 6/2004 | Heinonen et al. | 370/338 |
| 6,834,192 | B1 * | 12/2004 | Watanabe et al. | 455/444 |
| 6,842,460 | B1 * | 1/2005 | Olkkonen et al. | 370/465 |
| 6,909,705 | B1 * | 6/2005 | Lee et al. | 370/338 |
| 2001/0001268 | A1 | 5/2001 | Menon et al. | 370/329 |
| 2001/0012777 | A1 | 8/2001 | Igarashi et al. | 455/435 |
| 2001/0014917 | A1 | 8/2001 | Ishiyama et al. | 709/227 |
| 2001/0016492 | A1 | 8/2001 | Igarashi et al. | 455/433 |
| 2001/0017856 | A1 | 8/2001 | Asokan et al. | 370/389 |
| 2001/0020241 | A1 | 9/2001 | Kawamoto et al. | 707/202 |
| 2001/0023446 | A1 | 9/2001 | Balogh | 709/229 |
| 2001/0024443 | A1 | 9/2001 | Alriksson et al. | 370/401 |
| 2001/0031634 | A1 | 10/2001 | Mizutani et al. | 455/425 |
| 2001/0036224 | A1 | 11/2001 | Demello et al. | 375/220 |
| 2001/0044305 | A1 | 11/2001 | Reddy et al. | 455/436 |
| 2001/0048686 | A1 | 12/2001 | Takeda et al. | 370/401 |
| 2002/0010758 | A1 | 1/2002 | Chan | 709/218 |
| 2002/0013831 | A1 | 1/2002 | Astala et al. | 709/220 |
| 2002/0032855 | A1 | 3/2002 | Neves et al. | 713/154 |
| 2002/0032858 | A1 | 3/2002 | Nakano et al. | 713/159 |
| 2002/0034298 | A1 | 3/2002 | Gallagher et al. | 380/247 |
| 2002/0034301 | A1 | 3/2002 | Andersson | 380/270 |
| 2002/0035699 | A1 | 3/2002 | Crosbie | 713/201 |
| 2002/0037708 | A1 | 3/2002 | McCann et al. | 455/411 |
| 2002/0046179 | A1 | 4/2002 | Kokudo | 705/51 |
| 2002/0046285 | A1 | 4/2002 | Yasushi et al. | 709/229 |
| 2002/0052965 | A1 | 5/2002 | Dowling | 709/230 |
| 2002/0066029 | A1 | 5/2002 | Yi | 713/201 |
| 2002/0066032 | A1 | 5/2002 | Kurumida | 713/201 |
| 2002/0066036 | A1 | 5/2002 | Makineni et al. | 713/201 |
| 2002/0069278 | A1 | 6/2002 | Forslow | 709/225 |
| 2002/0073240 | A1 | 6/2002 | Kokkinen et al. | 709/249 |
| 2002/0075844 | A1 | 6/2002 | Hagen | 370/351 |
| 2002/0087335 | A1 | 7/2002 | Meyers et al. | 705/1 |
| 2002/0098840 | A1 | 7/2002 | Hanson et al. | 455/435 |
| 2002/0101848 | A1 | 8/2002 | Lee et al. | 370/349 |
| 2002/0114303 | A1 | 8/2002 | Crosbie et al. | |
| 2002/0115409 | A1 * | 8/2002 | Khayrallah | 455/41 |
| 2003/0036386 | A1 * | 2/2003 | Harrison | 455/438 |
| 2003/0072255 | A1 * | 4/2003 | Ma et al. | 370/208 |
| 2004/0025047 | A1 * | 2/2004 | Mayne et al. | 713/200 |
| 2005/0153725 | A1 * | 7/2005 | Naghian et al. | 455/520 |

FOREIGN PATENT DOCUMENTS

| | | |
|---|---|---|
| EP | 0 964 599 A | 12/1999 |
| EP | 0 982 662 A | 3/2000 |
| EP | 0 984 639 A | 3/2000 |
| EP | 1 011 243 A1 | 6/2000 |
| WO | WO 00/36522 | 6/2000 |
| WO | WO 01/50781 A2 | 7/2001 |
| WO | WO 02/09458 A2 | 1/2002 |
| WO | WO 02/065707 A2 | 8/2002 |
| WO | PCT/US02/08986 | 10/2002 |

OTHER PUBLICATIONS

Bluetooth Specification Version 1.1, *Part K:9: LAN Access Profile*:275-308 (2001).

Bluetooth Specification Version 1.1, *Section 10.9 Scatternet*:120-123 (2001).

Bluetooth Specification Version 1.1, *Part C: Link Manager Protocol*:184-252 (2001).

Bluetooth Specification Version 1.1, *Part H:1: Host Controller Interface Functional Specification*:536-780 (2001).

Bluetooth Specification Version 1.1, *Part H:2: HCI USB Transport Layer*: 782-796 (2001).

Bluetooth Specification Version 1.1, *Part H:3: HCI RS232 Transport Layer*:798-818 (2001).

Bluetooth Specification Version 1.1, *Part H:4: HCI UART Transport Layer*:820-826 (2001).

Etsi Hiperlan/2 standard [online], Sep. 2000 [retrieved on Jul. 16, 2001]. (3 pgs.) Retrieved from the Internet <http://www.etsi.org/technicalactive/hiperlan2.htm>.

Muller, T., Bluetooth White Paper, *Bluetooth Security Architecture*, Version 1.0: 1-33 (1999).

Schneiderman, R., "Bluetooth's slow dawn: Hype gives way to hard work as expectations for the mini radio network encounter nettlesome interoperability issues," *IEEE Spectrum*: 61-65 (2000).

Townsley, W., et al., Network Working Group, RFC 2661, "Layer Two Tunneling Protocol 'L2TP'," 1999 http://www.ietf.org/rfc/rfc2661.txt?number=2661, (2001).

Bluesocket Press Release "Bluesocket Secures 5M in First-Round Funding from St. Paul Venture Capital and Osborn Capital LLC", (2 pages) [online], [Retrieved on Nov. 19, 2002]. *Retrieved from the Internet*: <URL:http://www.bluesocket.com/news/funding.html>.

Bray et al., "Bluetooth—Connect Without Cables", (New Jersey, Prentice Hall, Mar. 20, 2001), XP002221666, p. 84, ¶5.7-p. 86, ¶5.8.

Bray et al., "Bluetooth—Connect Without Cables", (New Jersey, Prentice Hall, Mar. 20, 2001), XP002221667, p. 115-118.

Mouly et al., "GSM—The System for Mobile Communications" (Palaiseau, France, Sep. 2, 1993), XP002221665, p. 327-330.

International Search Report for International Application No. PCT/US01/51306, dated Dec. 3, 2002.

Bluetooth Specification Version 1.0 B, *10 Channel Control* (Nov. 29, 1999), pp. 95-126.

International Search Report for International Application No. PCT/US01/49547, dated Feb. 28, 2003.

International Search Report for International Application No. PCT/US02/30558, dated Mar. 28, 2003.

"PSDN Solution for CDMA2000 Networks," (2 pgs.)[online], [Retrieved on Jan. 25, 2002]. *Retrieved from the Internet*: <URL:http://www.cisco.com/warp/public/779/servpro/solutions/wireless_mobile/pdsn.html>.

Cisco White Paper, "Cisco Code-Division Multiple Access Performance Management", (15 pgs.) [online], [Retrieved on Jan. 25, 2002]. *Retrieved from the Internet*: <URL:http://www.cisco.com/warp/public/779/servpro/solutions/wireless_mobile/pdsn.html>.

Haartsen, J., "Bluetooth-The universal radio interface for *ad hoc*, wireless connectivity", *Ericsson Review No. 3*, pp. 110-117, 1998, XP000783249 ISSN: 0014-0171.

Lough et al., "A Short Tutorial on Wireless LANs and IEEE 802.11", (5 pgs.) [online], [Retrieved on Oct. 16, 2001]. *Retrieved from the Internet*: <URL:http://www.computer.org/students/looking/summer97/ieee802.htm>.

"Medium Access Control (MAC) and Physical (PHY) Specifications," *MAC Sublayer Management Entity*: 123-128, ANSI/IEEE Std 802.11 (1999).

Mitzel, D., "Overview of 2000 IAB Wireless Internetworking Workshop", (40 pgs.) [online], Dec. 2000 [Retrieved on Jan. 25, 2002]. *Retrieved from the Internet*: <URL:http://www.ietf.org/rfc/rfc3002.txt?number=3002>.

Perkins, C., "IP Mobility Support", (67 pgs.) [online], Oct. 1996 [Retrieved on Sep. 16, 2002]. *Retrieved from the Internet*: <URL:http://www.ietf.org/rfc/rfc2002.txt?number=2002>.

"A Practical Approach to Identifying and Tracking Unauthorized 802.11 Cards and Access Points", (26 pgs.) [online], [Retrieved on Sep. 10, 2001]. *Retrieved from the Internet*: <URL:http://www.interlinknetworks.com/graphics/news/wireless_detection_and_tracking.pdf>.

"RoamAD" (6 pgs.) [online], [Retrieved on Sep. 16, 2002]. *Retrieved from the Internet*: <URL:http://www.roamad.com/roam>.

Solomon, J., "Applicability Statement for IP Mobility Support", (5 pgs.) [online], Oct. 1996, [Retrieved on Jan. 25, 2002]. *Retrieved from the Internet*: <URL:http://www.ietf.org/rfc/rfc2005.txt?number=2005>.

Vernier Networks Whitepaper, "Controlling the Network Edge: Vernier Networks and the Enterprise", (7 pgs.) [online], Jun. 2002 [Retrieve on Sep. 10, 2002]. *Retrieved from the Internet*: <URL:www.verniernetworks.com>.

Vernier Networks Whitepaper, "High Availability for Wireless Edge Connectivity", (6 pgs.) [online], Jun. 2002 [Retrieve on Sep. 10, 2002]. *Retrieved from the Internet*: <URL:www.verniernetworks.com>.

Vernier Networks Whitepaper, "The Vernier Networks System", (7 pgs.) [online], [Retrieve on Sep. 10, 2002]. *Retrieved from the Internet*: <URL:www.verniernetworks.com>.

Vernier Networks Whitepaper, "The Three Phases of WLAN Deployments", (2 pgs.) [online], Jun. 2002 [Retrieve on Sep. 10, 2002]. *Retrieved from the Internet*: <URL:www.verniernetworks.com>.

Vernier Networks Whitepaper, "Vernier Networks: Ensuring the Promise of 802.11b Networks", (5 pgs.) [online], Jun. 2002 [Retrieve on Sep. 10, 2002]. *Retrieved from the Internet*: <URL:www.verniernetworks.com>.

Vernier Networks Whitepaper, "Wireless Security: Protecting Your 802.11 Network", (3 pgs.) [online], Jun. 2002 [Retrieve on Sep. 10, 2002]. *Retrieved from the Internet*: <URL:www.verniernetworks.com>.

International Search Report for International Application No. PCT/US01/23145, dated Aug. 16, 2002.

International Search Report for International Application No. PCT/US02/08986, dated Aug. 19, 2002.

\* cited by examiner

44 COMMUNICATIONS INTERFACE

60 HOST CONTROLLER INTERFACE

62 PACKET ENCAPSULATION MODULE

64 ENCAPSULATED PACKET

| 66 HOST DEVICE ADDRESS |
| 68 SEQUENCE NUMBER |
| 70 ACKNOWLEDGEMENT NUMBER |
| 72 HOST CONTROLLER COMMAND |

| 112 VERSION | 114 TYPE | 116-1 BD_ADDR | 116-2 BD_ADDR |
|---|---|---|---|
| 116-3 BD_ADDR | 116-4 BD_ADDR | 116-5 BD_ADDR | 116-6 BD_ADDR |
| 118 SEQUENCE NUMBER | | 120 ACKNOWLEDGEMENT NUMBER | |
| 122 PAYLOAD (E.G., HOST CONTROLLER COMMAND 72) | | | |

FIG. 9

METHOD AND SYSTEM FOR ENABLING CENTRALIZED CONTROL OF WIRELESS LOCAL AREA NETWORKS

RELATED APPLICATIONS

This application claims the benefit of U.S. Provisional Application No. 60/241,975, filed on Oct. 23, 2000, and is a continuation-in-part of U.S. patent application Ser. No. 09/911,092, filed Jul. 23, 2001, which claims the benefit of U.S. Provisional Application No. 60/220,385, filed Jul. 24, 2000. The entire teachings of the above applications are incorporated herein by reference.

BACKGROUND OF THE INVENTION

Networked desktop computing is typical in both the office and home. Networking of mobile devices, such as mobile telephones, laptop computers, headsets, and PDA's (Personal Digital Assistants), is more difficult. New wireless standards, such as IEEE 802.11 and Bluetooth (BT) are designed to enable these devices to communicate with each other and a wired LAN (Local Area Network).

Bluetooth is a low cost wireless connection technology. Bluetooth is essentially a point-to-point (PPP) wireless communication technology that was developed as a replacement for using cable (i.e., hard wired) connections between devices. The Bluetooth technology is described in the Bluetooth specification, available from Bluetooth SIG, Inc. (see also the www.bluetooth.com web site), the entire teachings of which are herein incorporated by reference. This technology provides for a common attachment approach for different devices, and so enables mobile phones, laptops, headsets, and PDA's to be easily networked in the office and eventually in public locations. Other standards, such as the IEEE 802.11 (Institute of Electrical & Electronics Engineers) and ETSI (European Telecommunications Standards Institute) HIPERLAN/2, provide a generally similar wireless connection function as Bluetooth and may be used to support WLAN (wireless LAN) communications. See the IEEE 802.11 "Wireless LAN Medium Access Control (MAC) and Physical Layer Specifications," the entire teachings of which are herein incorporated by reference. See also the ETSI specifications for HIPERLAN/2, such as ETSI document number TR 101 683, "Broadband Radio Access Networks (BRAN); HIPERLAN Type 2; System Overview," the entire teachings of which are herein incorporated by reference.

The Bluetooth technology provides for a piconet (or subnet), which is a group of up to eight devices, consisting of one master and a maximum of seven slaves that share a common hop sequence (based on a spread-spectrum frequency hopping technique, as is known in the art). Within the virtual channel created by a common hop sequence, the bandwidth is divided into seven time slots. One or more time slots are used for each master-slave communication. Amalgamating time slots increases capacity on that master-slave link.

As a user moves a mobile device connected to a WLAN from one location to another, the mobile device must establish a new connection with a new AP (access point, such as a local area network access point) when moving out of range of the previous AP. Typically, this transfer from the previous AP to the new AP requires the breaking down of the connection with the previous AP and the establishment of a new connection with the new AP.

SUMMARY OF THE INVENTION

One problem with both the IEEE 802.11 and Bluetooth standards has been a very limited or nonexistent ability for the mobile device to change its point of connection to the LAN (e.g., through an access point) in a seamless manner. This feature, known as "hand-offs" is required for many functions such as load balancing, improving radio link performance, and moving the mobile device inside a building without losing the network connection.

The Bluetooth standard version 1.1 does not support seamless hand-offs. The IEEE 802.11 standard does have the ability for the mobile device to change its point of LAN connection from one AP to another on the same IP sub-net (e.g., both AP's are directly connected via hubs or switches, not via a router), but the hand-off takes a number of seconds during which time there is no data flow. In addition the IEEE 802.11 standard has no method for the network to force the mobile device to transfer its LAN connection from one AP to another. This connection transfer is required for load balancing and improving the radio link quality of service.

A conventional approach, such as Bluetooth, may be modified to support hand-offs, but these hand-offs are typically controlled by the mobile device only, require changes to the software on the mobile device which stops backwards compatibility, and the hand-off itself is slow, which is a problem for some applications, such as voice communication.

The transfer of the mobile device from one AP to another occurs typically with a delay or interruption in the communications over the WLAN to the mobile device. Seamless hand-offs of the mobile device from one AP to another are required both for continuous coverage and for QoS (Quality of Service). In the latter case mobile devices are moved between co-located AP's so that users can be assigned, for example, their own dedicated channel (i.e., given a greater bandwidth).

The base version of Bluetooth has a 10 meter range and so if the Bluetooth technology is extended to enable Bluetooth to become a WLAN replacement, then an efficient, transparent and seamless approach to moving mobile devices from one piconet to another must be available. This approach must be transparent to layer 3 (i.e., network and route management layer) of the network interconnection layers (e.g., as specified in the Open System Interconnection Reference Model).

In the conventional Bluetooth approach, each member of the group (e.g., piconet or subnet) hops between seventy-nine different frequencies according to a sequence determined by the Bluetooth identifier (i.e., Bluetooth device address) of the master. All devices (e.g., mobile devices) have their own free running clock, but each uses a time offset to synchronize its hops with the master of a respective group. The master does not alter its clock. A device (e.g., mobile device) wanting to join a group is initially in master mode. Such a device must detect the timing offset needed to join the group and then make the relevant offset at the same time as it switches into slave mode. This process is referred to a "joining a piconet" and is described in more detail in the Bluetooth specification.

Once the devices are synchronized then it is possible to set up a PPP session from a slave (e.g., mobile device) to the master (e.g., AP), and hence link the slave through the master to an Ethernet LAN connected to the master. The AP normally terminates the PPP session, and so the data is then sent and received as level 2 IP packets to any suitable device, connected locally or remotely across the Internet. If one of the slaves moves beyond the range of the master, then the connection breaks and the mobile device must then, if possible, establish a new radio link, and PPP link with the most appropriate AP. Establishing a PPP session is a long process; for example, tens of seconds of connectivity are lost.

One solution is to move the termination of the PPP session at a central controller (e.g., roaming server or gateway server) rather than at the AP. This means that when the radio connection from a mobile device to the AP is broken and re-established with another AP, then, as long as the switchover between the two AP's is rapid, the PPP session between the mobile device and the central controller can be kept alive, hence avoiding the lengthy set-up process inherent in a PPP session. To implement this solution it is necessary for the mobile device to AP link to be seamlessly transferred from one AP to another. To achieve this all the AP'S are connected to a central controller (e.g., roaming server or gateway server) via an Ethernet LAN. Each master listens via a dedicated Bluetooth logical channel for all devices within range. When a master hears a new device, it relays this information back to the controller. In another case, one of the masters is maintaining a connection to a particular slave and signals to the controller that there is weakening reception for that slave as indicated by increased packet loss on the PPP link to that particular slave (this data is easily available from the PPP controller), and/or by another indication of weakening reception, such as RSSI (Received Signal Strength Indication). The controller can then look up another (or second) master with stronger reception of the mobile transmission and force a hand-off of the slave (i.e., transfer of the connection for the mobile device from the previous AP to the new AP). This type of hand-off approach typically requires special client software (e.g., in the mobile device).

It is possible to solve this problem of seamlessly moving mobile devices at layer 3 (i.e., by using PPP). This PPP approach requires all the AP's to extend the PPP connection back to a master controller (e.g., roaming server) that terminates the PPP connections and switches them from one AP to another as the user moves. The problem with this PPP approach is scalability and speed of 'hand-off' which can be several seconds.

The techniques of the present invention provide two approaches that work at a lower network layer than layer 3, namely, layer 2 or the data link layer. One approach of the invention involves spoofing the identity of the AP. This approach involves assigning a separate Bluetooth identifier number to the master for each of the seven available time slots. The other approach of the invention involves an extension to the master-slave switch feature provided by the Bluetooth specification to separate a slave from one piconet cleanly and then attach it to another operating piconet. This master-slave switching is relatively simple if there is only one slave per piconet but the invention provides a solution that works with multiple slaves in a piconet, such as seven active slaves per piconet, and also when there are other parked slaves.

Further, the present invention achieves this seamless hand-off without requiring client software, which is typically required in prior art approaches. In the present invention, the second master inherits the characteristics of the first master. These characteristics include session data, such as the Bluetooth identifier (or other WLAN identifier) of the access point and encryption keys, as well as the PPP magic number. The session data may also include an identifier for the mobile device. Also, either the clocks of both masters are synchronized, or the slave is instructed to change its frequency offset to match the new master.

If there is more than one slave per master, however, this transfer of identity will either result in two identical masters or the first master changing its identifier and hence breaking its link to the other associated slaves.

Thus, the present invention provides solutions to the problems indicated above without requiring special software (or hardware) in the mobile device (that is, changes from a conventional approach are only required in the AP's and the roaming server), as provided for in the embodiments described below. The techniques of the invention provide for use of spoofing AP's by transferring unique session data (access point device address, hop sequence, frequency offset, and encryption key) from one master AP to another so that the mobile device is unaware of the change in master. Higher level variables and link sessions such as IPSEC and PPP are held at the switch (e.g., controller, roaming server, or gateway server). The present invention also provides for the assignment of a series of unique Bluetooth Device (BD) addresses to the AP, one for each mobile device; so that each mobile device believes it is talking to a different master AP when in fact the AP is changing its BD address for each master-slave link. BD addresses are selected that do not synchronize the associated hop patterns but minimize the chance of a collision.

Thus, in one aspect, the present invention provides a method and system for performing a seamless handoff of a mobile device from an initial access point (e.g., initial AP) to a target access point (e.g., target AP). In particular, the method of the system (e.g., gateway application in a roaming server) includes (a) assigning session data to the initial access point to establish an initial connection from the mobile device through the initial access point to the roaming server, (b) detecting a triggering event that initiates a transfer of the mobile device from the initial access point to the target access point, and (c) transferring assignment of the session data from the initial access point to the target access point to establish a target connection from the mobile device through the target access point to the roaming server. This transfer of assignment is based on the session data and is in response to detecting that the triggering event has occurred, thus enabling the mobile device to use the session data to communicate with the target access point, such that the mobile device transfers seamlessly (without loss of connection and/or interruption of the current session with the user) from the initial access point to the target access point.

In another aspect, the present invention provides for the use of the master-slave switch to separate a slave from a piconet cleanly by forcing it to change into a master and then to associate it with another AP before switching it back to a slave in a piconet associated with the second AP. The present invention provides a method and system (e.g., roaming server) in a wireless local area network for performing a seamless handoff of a mobile device from an initial piconet having an initial access point (e.g., initial AP) to a target piconet having a target access point (e.g., target AP). In particular, the method includes assigning the mobile device associated with the initial access point a master role for the initial piconet, assigning the target access point a slave role in the initial piconet while the target access point retains a master role in the target piconet, and establishing an association of the mobile device with the target piconet by switching roles of the mobile device and target access point. The mobile device establishes the association with the target piconet as a slave of the target piconet. The target access point terminates the slave role of the target access point with the initial piconet, while the target access point maintains the master role in the target piconet, such that the mobile device transfers seamlessly from the initial piconet to the target piconet.

In a further aspect, the present invention provides for splitting of the wireless protocol stack so that only the part required to deal with the radio frequency interface is located in the AP and the remainder of the stack is located in the central roaming server. The two parts communicate through a communications layer such as UDP packets sent over a LAN (e.g., Ethernet) that encapsulated host controller commands sent between the AP and the roaming server. This split is appropriate for all wireless protocols. The present invention provides a method and system (e.g., roaming server) for enabling seamless roaming of mobile devices among access points in a wireless local area network. In particular, the method includes (a) establishing a host controller interface in the roaming server, (b) encapsulating host controller commands in a packet-based network protocol for use in communication with access points in the wireless area network, the host controller commands directed to a connection session of the mobile device with the wireless local area network, and (c) exchanging the encapsulated host controller commands with access points in the wireless area network to enable a mobile device to receive the host controller commands and maintain the connection session while roaming among the access points.

In another aspect, the present invention provides an encapsulated packet for encapsulating and communicating commands based on a host controller interface using a packet-based network protocol. The encapsulated packet includes a host controller command based on the host controller interface, device address of a host exchanging the encapsulated packet, a sequence number for use in a series of encapsulated packets, and an acknowledgment number for use in acknowledging a previously transmitted encapsulated packet.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a block diagram of the communications interface of FIG. 2 including a host controller interface and a packet encapsulation module.

FIG. 9 is a block diagram of the packet format of the present invention for an encapsulated packet for a host controller interface command based on a network based packet protocol.

DETAILED DESCRIPTION OF THE INVENTION

A description of preferred embodiments of the invention follows.

Figure 1:
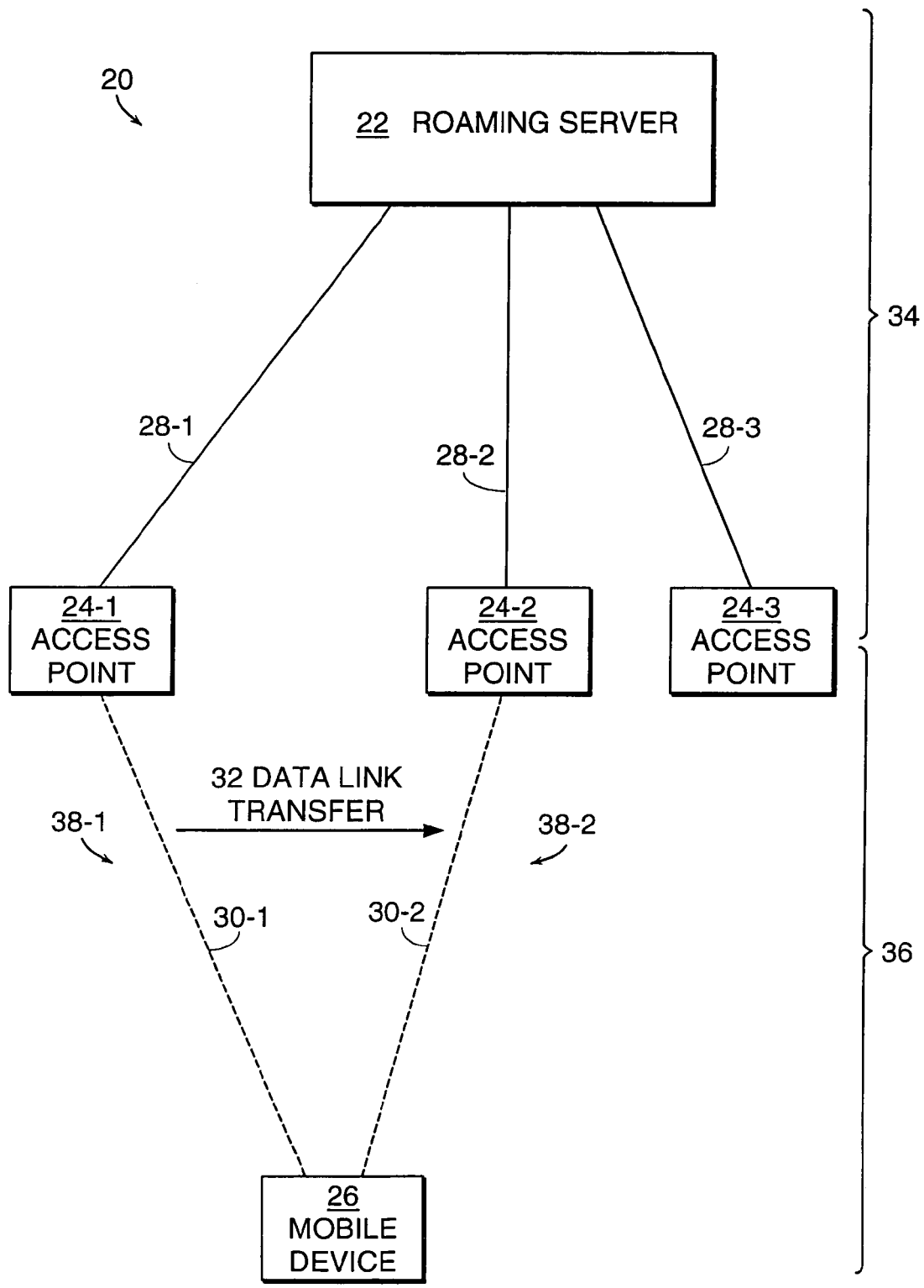
FIG. 1 is a block diagram of a wireless local area network, including a roaming server, access points, and mobile device according to the present invention.

FIG. 1 is a block diagram of a network 20 including a roaming server 22, access points 24 (e.g., 24-1, 24-2, 24-3) to a WLAN (wireless local area network) 36, and mobile device 26. The network 34 is any suitable network for connecting access points 24 to a roaming server, such as a hard-wired Ethernet LAN or a wireless network using a wireless communications protocol. In one embodiment, the network 34 is hard-wired for part of the network 34 and wireless for one or more other parts of the network 34 (using one or more wireless communications protocols). The WLAN 36 is a network established in accordance with a wireless technology, which the present invention does not require to be the same as any wireless communication protocol or technology used in the network 34. In general, as used herein, the term "wireless technology" refers to a Bluetooth protocol technology, a IEEE 802.11 protocol technology, a ETSI HIPERLAN/2 protocol technology, or other wireless technology suitable for a WLAN 36 (e.g., typically providing coverage over 10 to 100 meters). The network 34 may use such a wireless technology for all or part of the network 34, or may use some other suitable wireless communications protocol. The network connection 28 (e.g., 28-1, 28-2, and 28-3) may be a hardwired connection, such as an Ethernet connection on a LAN 34, or may be a wireless connection based on a wireless technology or other suitable wireless communications protocol. The wireless connection 30 (e.g., 30-1 and 30-2) is a communication connection not requiring a hard-wired cable or link. For example, the wireless connection 30 is based on radio, optical, infrared, acoustic, or other non-hard-wired media.

Figure 2:
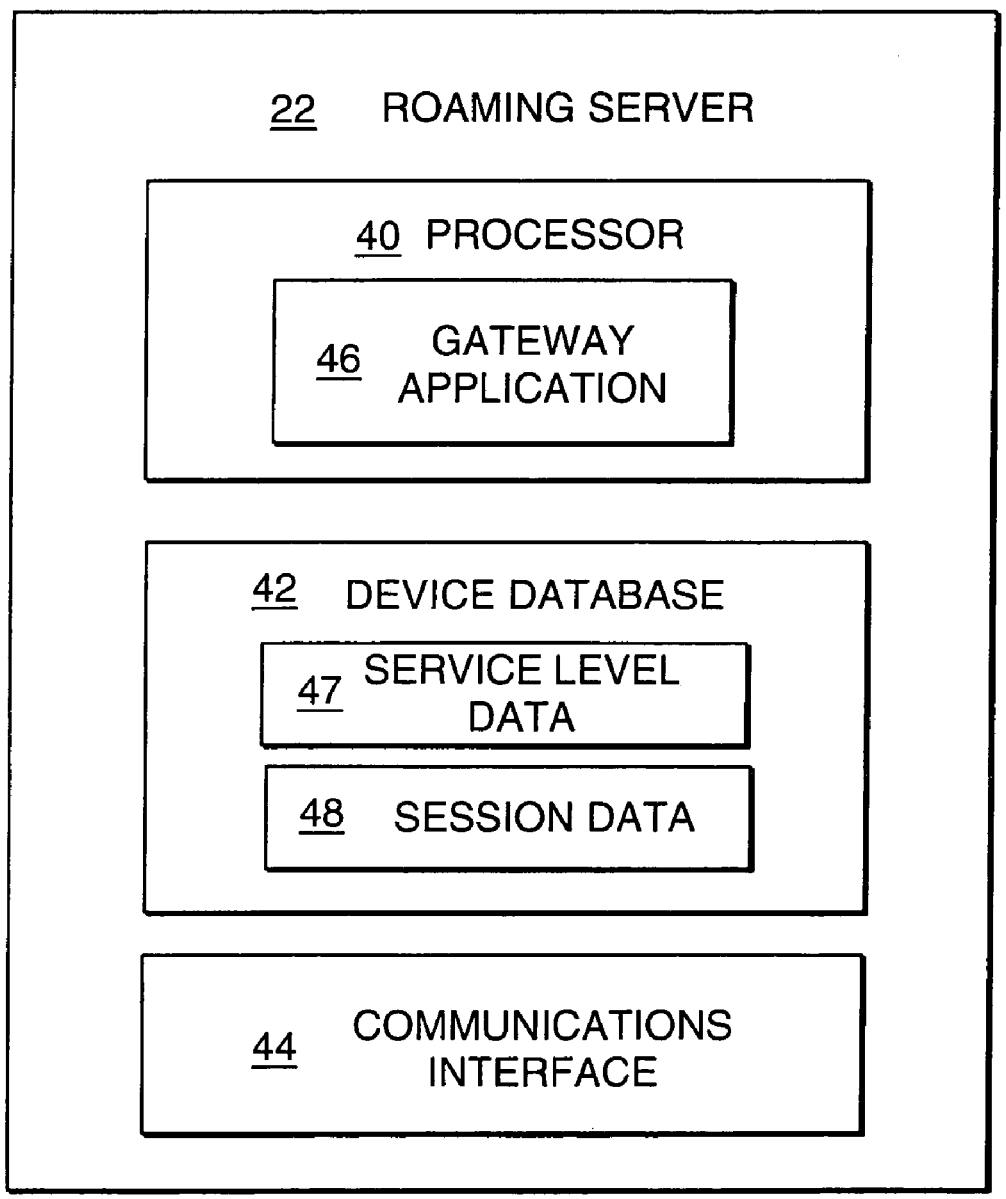
FIG. 2 is a block diagram illustrating the components within the roaming server of FIG. 1.

The roaming server 22 is any suitable computing device or digital processing device that may serve as a server in the network 20. Such a roaming server 22 can be a server, a router, a bridge, a switch, or other device that may serve the purpose of a central controller or a gateway server in the network 20. In one embodiment, the roaming server 22 is not a single physical entity, but the functionality of the roaming server 22 (such as shown in FIG. 2) is provided by a number of physical units (e.g., computers, servers, and/or network devices) that are networked together.

The access point 24 typically has a network connection 28 to the roaming server 22. The access point 24 also acts as a receiving point, or connecting point, to establish the wireless connection 30 with each mobile device 26. In that case, the access point 24 is equipped to recognize a wireless technology connection 30.

The mobile device 26 is any suitable type of device that will support a wireless technology. The mobile device 26 may be a computer with wireless connection adapter, a PDA (personal digital assistant), or a mobile telephone such as a cellular telephone. The WLAN subnet or channel 38 (e.g., 38-1 and 38-2) is an access point 24 and one or more mobile devices 26. In the case of the Bluetooth wireless technology, when there is more than one mobile device 26, then the WLAN subnet or channel 38 is termed a "piconet" and conventionally has up to seven mobile devices 26. When there is only one Bluetooth mobile device 26, then the channel 38 is known as a point to point link. For the present invention, even if there is more than one Bluetooth mobile device 26 connected to the access point 24, each Bluetooth mobile device 26 connected to the access point 24 views the channel 38 as a point to point link. The techniques of the present invention enable more than seven mobile devices 26 to connect to a single access point 24. The exact number depends on system performance. In the case of the IEEE 802.11 standard, a number of mobile devices 26 (potentially greater than seven, but limited by the address range within the subnet associated with that access point 24) are associated with a single access point 24.

To summarize briefly the operation of a transfer of the data link 32 from one access point 24-1 to another access point 24-2, the roaming server 22 determines that a mobile device 26 should change its LAN connection point from access point 24-1 to access point 24-2 based on a triggering or initiating event. Such an event can be the moving of the mobile device 26 (e.g., when the user moves the mobile device 26 from one location to another), or receiving a request from a mobile device 26 or access point 24 to move the mobile device 26. The triggering or initiating event can also be a load balancing event, such as receiving an indication that one access point 24 is congested and another access point 24 is less congested (e.g., so that the mobile device 26 can be moved to another access point 24 to obtain a higher level of service, such as more bandwidth). The triggering or initiating event can also be receiving an indication of the quality of service level assigned to the user of the mobile device 26 (e.g., moving the mobile device 26 to a new access point 24 to fulfill a predefined service level for the user of the mobile device 26). Furthermore, the triggering event can also be a indication of a poor or declining quality of the connection 30 (e.g., radio link) between the mobile device 26 and an access point 24 (e.g., resulting in a transfer of the mobile device 26 from one access point 24-1 to another access point 24-2 that provides an improved quality of service for the mobile device 26 over the radio link).

In general, the triggering event triggers a temporary or permanent handoff of the mobile device 26 from one access point 24-1 to another access point 24-2. The handoff may be due to a transient situation, such as due to temporary congestion of access point 24-1, or temporary decline in connection quality in the initial connection 30-1 (e.g., radio link quality). If the handoff is temporary, the initial access point 24-1 keeps knowledge of the mobile device 26 for a predefined period of time (e.g., short period of time) so that the mobile device 26 may transfer back to the initial access point 24-1 after the termination of the transient situation. The temporary handoff from one access point 24-1 to another access point 24-2 should occur quickly (i.e., without apparent or substantial interruption in the service to the mobile device 26), as is supported by the techniques of the present invention, as described herein. If the handoff is permanent, the initial access point 24-1 loses all knowledge of the mobile device 26. In general, if the handoff is temporary, but the transient situation persists, then the handoff may be made permanent.

After such a triggering or initiating event, the roaming server 22 instructs access points 24-1 and 24-2 to make a seamless handoff of the mobile device 26 from access point 24-1 to access point 24-2 at the data link level in a data link transfer 32 (that is, in the case of the Bluetooth technology, from point to point link 38-1 to point to point link 38-2, and, in the case of the IEEE 802.11 technology, from shared radio channel 38-1 to shared radio channel 38-2). In making this type of transfer at the data link transfer level 32, the transfer is transparent to the mobile device 26 and the connection 30-1 is transferred or reestablished as the wireless connection 30-2 without a requirement for a special technology or special software in the mobile device 26 (beyond the conventional wireless technology required to support communications over the WLAN 36).

In one example of determining that a mobile device 26 should change point to point links 38-1 to 38-2, the roaming server 22 first receives information (i.e., the triggering or initiating event) from access point 24-1 currently supporting the mobile device 26 as the mobile device 26 moves out of the range of access point 24-1. For example, this movement is indicated by a declining rate of packets (e.g., wireless connection packets based on the wireless technology) received at access point 24-1. The roaming server 22 then directs the access point 24-2 to establish a relationship or connection 30-2 with the subject mobile device 26. The roaming server 22 must have some indication from the access point 24-2 that the mobile device 26 is moving within range of that access point 24-2. In a preferred embodiment this indication may be provided by a query broadcast over the wireless medium (e.g., query over a radio frequency suitable for use with the WLAN 36 based on the wireless technology) from access point 24-2 to detect what mobile devices 26 are within range of the access point 24-2. When this is occurring, the roaming server 22 can instruct access points 24-1 and 24-2 to make the seamless handoff of the mobile device 26 as a data link transfer 32.

The roaming server 22 also determines base a triggering or initiating event based on congestion, quality of service level, or load balancing considerations. In this case, piconets 38-1 and 38-2 can be considered co-located (that is, provide wireless coverage to overlapping areas). For example, the mobile device 26 is within range of each access point 24-1 and 24-2 and may be connected, optionally, to either access point 24-1 or 24-2. In general, in a crowded environment such as a conference room there may well be multiple devices 26 desiring high speed WLAN 36 access.

Users may choose which access point 24 to join by signaling via the loading variable in the SDP (service discovery protocol) for the case of the Bluetooth technology, and the beacon for the case of IEEE 802.11 technology (based on proposed modifications to the IEEE 802.11 standard). Alternatively, users may be directed to join a particular access point 24 by signaling via the loading variable in the radio protocol header or beacon. Generally, it may be desirable to introduce different levels of service for different users.

In operation, the mobile device 26 requests service from an access point 24 by sending a request along with the device address of the mobile device 26. The access point 24 would normally respond by paging the mobile device 26 and starting the synchronization between the access point 24 and the mobile device 26. Instead, in the present invention, the access point 24 passes the request along with the device address of the mobile device 26 back to the roaming server 22 which looks up the user's service level data 47 in the device database 42 (see FIG. 2) and the loading on each of the relevant access points 24 (e.g., traffic or congestion on the subnet that the mobile device 26 is connected to). In the case of the Bluetooth technology, the roaming server 22 then directs that the mobile device 26 connect to the appropriate access point 24 (this may not be the access point 24 that received the request). For example, the mobile device 26 requests service from access point 24-1, but, after determining the user's service level, the roaming server 22 signals access point 24-2 to page the mobile device 26 and establish a connection 30-2. In the case of the IEEE 802.11 technology, the roaming server 22 signals to all the relevant access points 24-1, 24-3 except the desired access point 24-2 to suppress their beacons.

When the mobile device 26 moves to a new connection 38 and starts to send packets, the roaming server 22 looks up the mobile device 26 in the device database 42, and according to the user service level data 47 and WLAN loading, the roaming server 22 might decide that the mobile device 26 should be communicating via another connection 38 that is covering that mobile device 26. That is, one access point 24 may offer a higher level of available bandwidth (i.e., lower level of congestion) for the mobile device 26 than another access point 24 that has less bandwidth available (i.e., higher level of congestion). For example, the preferable access point 24 may have fewer mobile devices 26 connected to it and thus more bandwidth available. The roaming server 22 may direct the mobile device 26 to a different access point 24. In either case the mobile device 26 is forced to transfer its connection 30. For example, a user moves a mobile device 26 within range of both access points 24-1, 24-2. The mobile device 26 seeks to make a connection 30-1 to congested access point 24-1. The roaming server 22 thus directs the mobile device 26 to join a less congested access point 24-2, with the result shown by connection 30-2. Subsequently, the mobile device 26 moves to the less congested access point 24-2 in a seamless handoff, according to the techniques of the invention as described herein, without requiring re-registration with the roaming server 22.

The congestion at access point 24-1 may also be due to a transient situation or problem, such a temporary increase in traffic by one or more of the mobile devices 26 connected to access point 24-1. For example, after the mobile device 26 transfers to access point 24-2, the transient situation (e.g., congestion) at access point 24-1 terminates, and then the roaming server 22 directs the mobile device 26 to transfer back to access point 24-1.

As described earlier, a mobile device 26 may experience declining connection quality of the connection 30-1 (e.g., radio link) to the initial access point 24-1 (also termed the primary access point 24-1) due to some transient situation or problem. For example, path attenuation occurs if a human body is in the path of the radio link 30-1 between the mobile device 26 and the primary access point 24-1. That is, someone may be sitting down or standing in the path. The connection quality declines to a comparatively low level; for example, as measured by the signal strength of the connection 30-1 having a lower level (e.g., lesser amplitude) than the signal strength of the connection 30-2. The roaming server 22 directs the mobile device 26 to transfer from the primary access point 24-1 to a secondary access point 24-2 that has the better connection quality for the connection 30-2 (quality of the radio link) to the mobile device 26. This transfer may be temporary and the transient situation may terminate; for example, if the person obstructing the path moves out of the path. Then the roaming server 22 directs the mobile device 26 to transfer back from the secondary access point 24-2 to the primary access point 24-1.

FIG. 2 is a block diagram illustrating the components within the roaming server 22. These components include a digital processor 40, a device database 42, and a communications interface 44. The digital processor 40 hosts and executes a gateway application 46 in the working memory of the roaming server 22. The gateway application 46 serves to provide for the management of the connections of the roaming server 22 to other devices, such as access points 24 and mobile devices 26 (typically through connections through access points 24). For example, the gateway application 46 may instruct an access point 24-1 to perform a transfer of wireless connections 30-1 so that the mobile device 26 can establish a new connection 30-2 with a different access point 24-2. In one embodiment, the gateway application 46 is implemented partially or totally in hardware, such as in an ASIC (application-specific integrated circuit).

The device database 42 in the roaming server 22 is a memory or disk or other storage device that provides database and storage services for the roaming server 22, such as providing service level data 47 that may be assigned to a mobile device 26, or a user of the mobile device 26. In another example, the device database 42 can provide information and store information on a wireless connection 30 such as wireless connection 30-1 so that the wireless connection 30-1 may be reestablished at a different access point 24 such as wireless connection 30-2 (i.e., using the same communication parameters as wireless connection 30-1 based on information that is stored in the device database 42 in the roaming server 22). The session data 48 is an example of such information, and can include the AP device address 52 (described for FIG. 3) and other information, such as encryption information. In one embodiment, the session data 48 also includes a mobile device address that the roaming server 22 assigns to the mobile device 26. For example, when the present invention is implemented for a Bluetooth wireless technology, the AP device address 52 is a BD_ADDR (Bluetooth device) address, and the mobile device address is an AM_ADDR (active member of a piconet) address. In another example, when the present invention is implemented for an IEEE 802.11 wireless technology, the AP device address 52 is a MAC (Medium Access Control) address, and the mobile device address is an AID (Association Identifier).

The device database 42 can be part of the roaming server 22, or may be accessed by the roaming server 22 over a communications connection or network connection (e.g., Internet connection).

A communications interface 44 of the roaming server 22 provides an interface to provide communications with other devices, such as a network interface to support network connections 28 over the LAN 34 to the access points 24. For example, the communications interface 44 is based on a NIC or Network Interface Card along with associated network communication software.

In one embodiment, a computer program product 80, including a computer readable or usable medium (e.g., one or more CDROM's, diskettes, tapes, etc.), provides software instructions for the gateway application 46. The computer program product 80 may be installed by any suitable software installation procedure, as is well known in the art. In another embodiment, the software instructions may also be downloaded over a wireless connection. A computer program propagated signal product 82 embodied on a propagated signal on a propagation medium (e.g., a radio wave, an infrared wave, a laser wave, a sound wave, or an electrical wave propagated over the Internet or other network) provides software instructions for the gateway application 46. In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product 80 is a propagation medium that the computer may receive and read, such as by receiving the propagation medium and identifying a propagated signal embodied in the propagation medium, as described above for the computer program propagated signal product 82.

Figure 3:
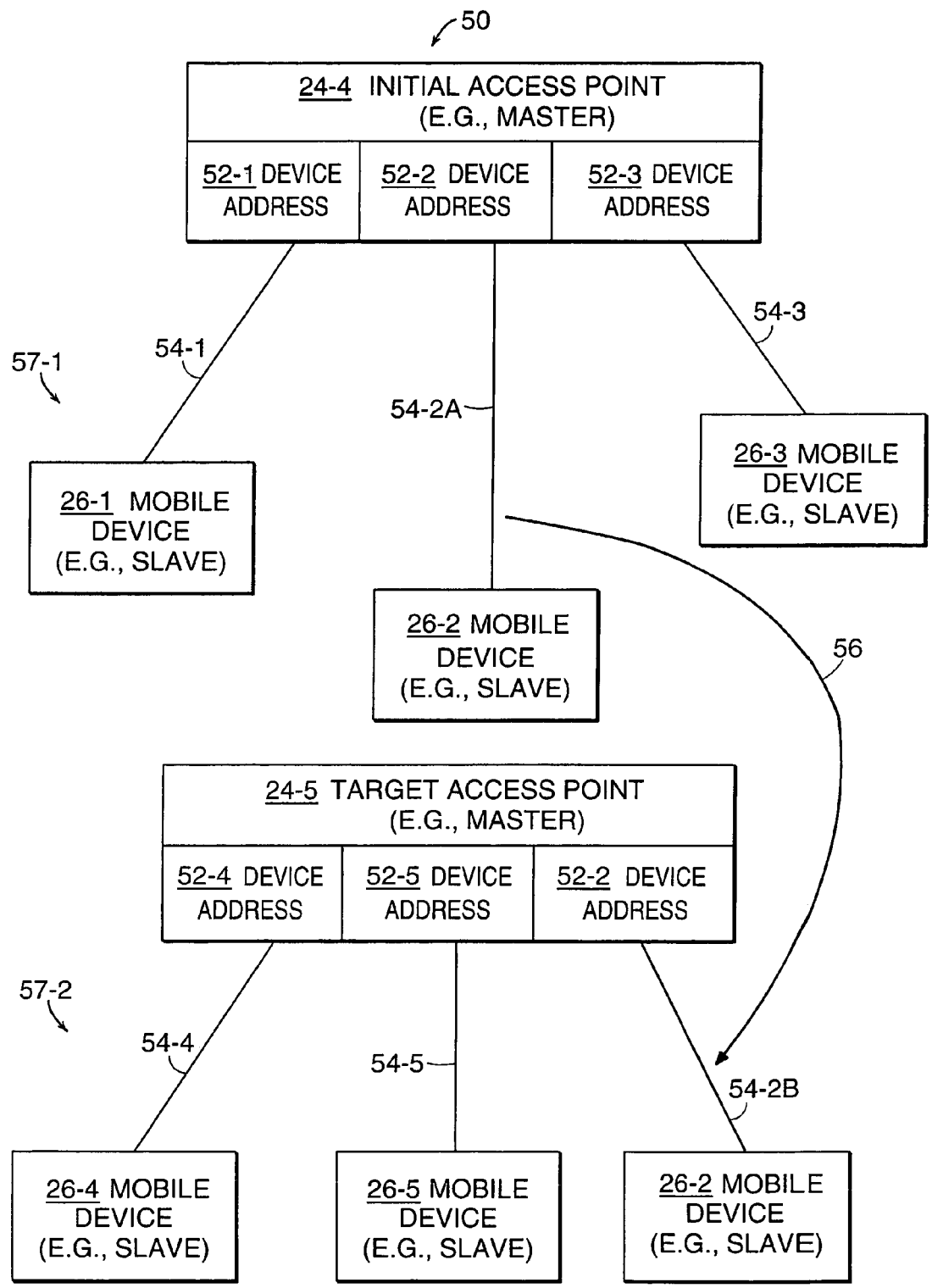
FIG. 3 is a block diagram illustrating two access points having the same access point device address to provide a seamless transfer for a roaming mobile device according to the present invention.

FIG. 3 is a block diagram of a WLAN 50 with two access points 24-4 and 24-5 that provide a seamless transfer for a roaming mobile device 26-2 using an access point device address transfer or spoofing approach according to the present invention. The AP device address 52 (e.g., 52-1, 52-2, 52-3, 52-4, and 52-5) is an identifier that provides an identification or address of an access point 24 in the WLAN 50. For example, for a Bluetooth implementation, the AP device address 52 is a Bluetooth device address (BD_ADDR). In another example, for an IEEE 802.11 implementation, the AP device address 52 is a MAC (Media Access Control) address. The communication channel 54 (e.g., 54-1, 54-2, 54-3, 54-4, and 54-5) is a wireless communication link according to a wireless technology. In one embodiment, the communication channel 54 is an example of a wireless connection 30, as illustrated in FIG. 1. The point to point link 57 (e.g., 57-1 and 57-2) is a WLAN subnet, typically supported by a respective access point 24. In one embodiment, the WLAN 50 is one example of the WLAN 36 of FIG. 1, and the point to point links 57-1 and 57-2 are examples of the point to point link 38 of FIG. 1. Communication link transfer 56 indicates the transfer of the mobile device 26-2 from point to point link 57-1 to point to point link 57-2 using AP device address spoofing (i.e., the same AP device address 52-2 is used for access point 24-5 as for access point 24-4). Thus, communication channel 54-2A (between access point 24-4 and the mobile device 26-2) is based on AP device address 52-2, and communication channel 54-2B (between access point 24-5 and the mobile device 26-2) is also based on the same AP device address 52-2.

Figure 4:
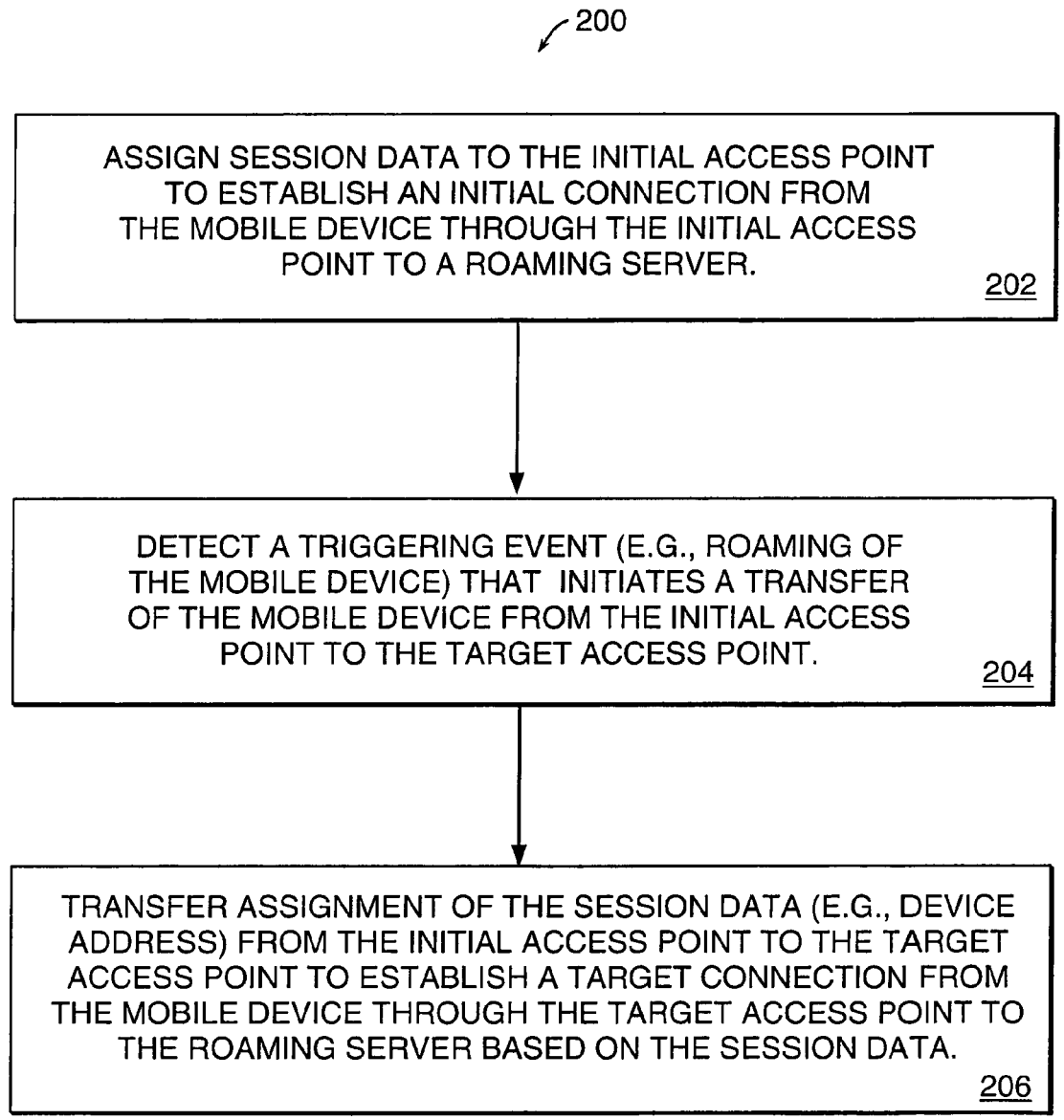
FIG. 4 illustrates a procedure for a seamless transfer of a mobile device between two access points according to the present invention.

FIG. 4 illustrates a procedure 200 for a seamless transfer of a mobile device 26 between two access points 24 using the AP device address spoofing of FIG. 3. In step 202, a gateway application 46 in a roaming server 22 assigns session data 48 to the initial access point 24-4 to establish an initial connection 54-2 from the mobile device 26-2 through the initial access point 24-4 to the roaming server 22. The session data 48, for example, includes the AP device address 52-2, which is assigned to the initial access point 24-4 by the roaming server 22. In one embodiment, the roaming server 22 assigns a mobile device address to the mobile device 26 that is also included in the session data 48.

In step 204, a communications interface 44 of the roaming server 22 detects a triggering event that initiates a transfer of the mobile device 26-2 from the initial access point 24-4 to the target access point 24-5. This transfer is indicated by a communications link transfer 56 in FIG. 3. The triggering event, for example, can occur when the mobile device 26-2 is moved by the user from one location to another so that the mobile device 26-2 is moving out of range of the initial access point 24-4 and into range of the target access point 24-5. The triggering event can also be indicated by conges-tion or the need for load balancing for the initial access point 24-4. For example, point to point link 57-1 may become congested in comparison to point to point link 57-2. Thus, the roaming server 22 initiates the transfer of the mobile device 26-2 from the initial access point 24-4 to the target access point 24-5. The triggering event can also be indicated by a decline in connection quality for connection 54-2A.

In step 206, the gateway application 46 transfers assignment of the session data 48 from the initial access point 24-4 to the target access point 24-5 to establish a target connection 54-2 from the mobile device 26-2 through the target access point 24-5 to the roaming server 22 based on the session data 48. For example, the session data 48 includes the AP device address 52-2, which the gateway application 46 is now assigning to the target access point 24-5 when it was previously assigned to the initial access point 24-4. The mobile device 26-2 can establish the same connection 54-2 using the AP device address 52-2 to the target access point 24-5. Thus, the mobile device 26-2 is using the same session data 48 when communicating with the target access point 24-5 that it was using when communicating with the initial access point 24-4.

For the example of an implementation based on IEEE 802.11 wireless technology, to accomplish the handoff using the techniques of the present invention, the target access point 24-5 (secondary access point) constructs a spoof frame (based on an 802.11 frame) that includes the AP device address 52 (MAC address) of the initial access point (primary access point), the mobile device address (Association ID) of the mobile device 26 that was assigned by the roaming server 22 to the mobile device 26, as well as any data to be transferred. For example, the roaming server 22 determines that the connection quality of a connection 30 (radio link connection) is declining, and thus sends the next data packet to the target or secondary access point (e.g., 24-5) and instructs it to create the spoof frame to be sent to the mobile device 26-2.

In another example of using the techniques of the present invention in an implementation based on IEEE 802.11 technology, the roaming server 22 instructs the target or secondary access point 24-5 to listen for a packet from the mobile device 26-2 even if the packet is addressed to another access point (e.g., 24-4) having a different MAC address, so that packets could be returned from either access point (e.g., 24-4 or 24-5). Generally, each access point 24 is aware of all the packets that arrive on a radio channel (e.g., assuming the channel can be accessed by both access points 24-4 and 24-5). To avoid interference between the access points 24-4 and 24-5 if on the same channel, frequency hopping between the main and spoofing channels could be used. In this case, both access points 24-4 and 24-5 normally operate on different main channels, but the controller or roaming server 22 forces secondary or target access point 24-5 to jump onto the same channel as the primary or initial access point 24-4 to send the spoofed packet.

In a conventional IEEE 802.11 approach, the access point 24 changes channels in response to SNMP (Simple Network Mangement Protocol) MIB-2 (Management Information Base) commands, which are kept in a queue to be processed on a best efforts basis. Typically, such a command is executed an indeterminate amount of time after the command is received. The present invention provides for a direct link between the access point 24 and the controller or roaming server 22 that can force an immediate channel change (as soon as the current packet is sent or received).

In a conventional IEEE 802.11 approach, the access point 24 uses a look up table to determine what to do with packets that arrive with a particular device address 52 (MAC address). When the mobile device 26 associates with an access point 24, then the device address 52 (MAC address) is added to this look-up table (and removed when the mobile device 26 disassociates from that access point 24).

In one embodiment for an IEEE 802.11 implementation, the present invention provides that the look-up table be expanded to include a new category called "watch out". For example, the watch out category includes device addresses 52 (MAC addresses) and spoofing channels that the access point 24 should look out for. When the access point 24 receives packets with one of these device addresses 52 (MAC addresses), at a receiver signal strength (RSSI) above a certain, predefined signal strength then the access point 24 sends a notification packet to the controller or roaming server 22.

In one embodiment for use with an IEEE 802.11 implementation, each mobile device 26 is synchronized with its access point 24-4, and typically changes synchronisation when associating with a different access point 24-5. If the access points 24-4, 24-5 are on different channels, they are members of different ESS's (extended service sets). Then, the access points 24-4, 24-5 can be synchronized (because they are allowed to be synchronized because they are on different ESS's), thus avoiding any delay due to synchronization when the mobile device 26 is transferred form one access point 24-4 to the other access point 24-5.

For the example of an implementation of the present invention based on Bluetooth wireless technology, the techniques of the present invention support seamless hand-offs of a mobile device 26 between two access points 24 by assigning a unique BD_ADDR (Bluetooth device) address for the AP device address 52 to the access point 24 for each communication channel 54 that it is supporting. In a conventional piconet 57 (or subnet), the communication channel 54 is a master-slave link. The master (e.g., access point 24) can have up to seven slaves (e.g., mobile devices 26), each slave following a hop pattern (based on a spread spectrum frequency hopping) set by the master. Each master-slave communication channel 54 occupies one or more time slots.

In a Bluetooth device address spoofing point to point link 57, the access point 24 has a particular AP device address 52 associated with each master-slave link (i.e., communication channel 54). So in case of seven slaves there are seven communication channels 54 (e.g., master-slave links), and the access point 24 changes its AP device address 52 for each time slot. The access point 24 does not, however, need to change its timing offset as this is set by the clock of the access point 24, so all the slaves (e.g., mobile devices 26) are in synchronization with the master (e.g., access point 24). As each communications channel 54 is associated with a particular AP device address 52, the slaves hop between frequencies in synchronization with the access point 24 but they are no longer synchronized with each other.

This AP device address spoofing approach of the invention has several effects, as described in the following paragraphs.

It is easy to move mobile devices 26 between access points 24 by copying the session data 48, such as appropriate AP device address 52 and encryption codes, from one access point 24 to another access point 24. The session data 48 is the data for the current session between the mobile device 26 and the access point 24 based on a connection 30. The session data 48 can include the AP device address 52 (e.g., Bluetooth address), mobile device address, hop sequence, frequency offset, and encryption data (e.g., encryption key or codes). The movement of session data 48, such as the AP device addresses 52 and encryption codes, is achieved by controlling all the access points 24 from a central roaming server 22. By having all the access points 24 in synchronization there is no clock offset to adjust, although this issue can be resolved using a clock offset command (e.g., Bluetooth clock offset command). The clock offset command may be required because Bluetooth devices, such as access points 24 and mobile devices 26, normally having free running clocks. Creating a piconet 57 requires each slave to temporarily apply an offset to their clock so as to synchronize clocks with the master.

The AP device address spoofing approach of the invention also permits a master (e.g., access point 24) to have an almost unlimited number of slaves (e.g., mobile devices 26) attached to it. This is possible because on each time slot there can be multiple slaves, each in synchronization with a different AP device address 52, and so hopping to a different sequence derived from the AP device address 52.

For example, a roaming server 22 that controls the access point 24-4 can decide, for each time slot, which AP device address 52-3 to give the access point 24-4. This AP device address 52-3 determines which mobile device 26-3 that the roaming server 22 communicates with through the access point 24-4. In this example, all the other mobile devices 26-1 and 26-2 connected to the access point 24-4 are probably on the wrong frequency when the roaming server 22 transmits the packet intended for mobile device 26-3. Thus, the other mobile devices 26-1 and 26-2, in effect, hear nothing from the roaming server 22 but they continue to stay in synchronization with the access point 24-4.

Occasionally two or more mobile devices 26 receive the same packet from the roaming server 22. All mobile devices 26, except the one intended to receive the packet, reject the packet because the encryption key does not work. In one embodiment, it is also possible to have a number of mobile devices 26 associated with the same AP device address 52 and use different encryption keys to designate the appropriate recipient. The techniques of the invention enable unlimited numbers of mobile devices 26 (i.e., slaves) per piconet 57 and provide an alternative means of paging a mobile device 26, thus eliminating any constraint on the number of parked devices 26 (i.e., parked slaves).

If the transfer of the assignment of the session data 44 (step 202 in FIG. 4) is due to a transient situation, as described previously, the roaming server 22 may reassign the session data 44 to the initial access point 24-2 to re-establish the initial connection 54-2A after a termination of the transient situation. Thus the roaming server 22 reassigns the AP device address 52-2 to the initial access point 24-4 so that the mobile device 26-2 can communicate with the initial access point 24-4 using the same AP device address 52-2 that it used previously to communicate with the initial access point 24-4.

Figure 5:
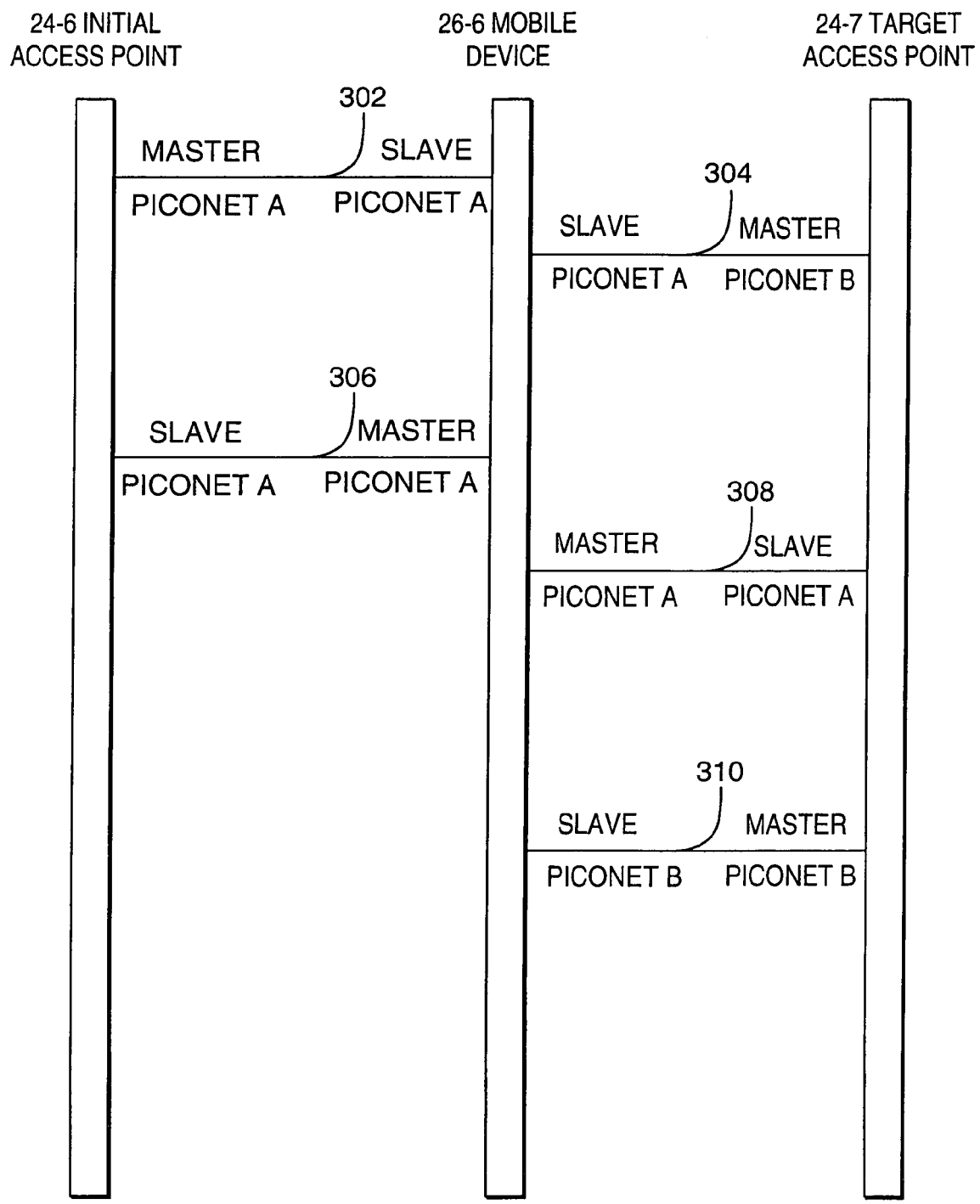
FIG. 5 is a representation of the master/slave relationships of an initial access point, a mobile device, and a target access point during a master-slave switch according to the present invention.

FIG. 5 is a representation of the master-slave relationships 302, 304, 306, 308, 310 of an initial access point 24-6, a mobile device 26-6, and a target access point 24-7 during a master/slave switch according to the present invention.

A master-slave switch (MSS) is a conventional, known operation in which the master (typically the creator of a piconet 38, such as an access point 24) and a slave (e.g., mobile device 26) switch roles so that the former master becomes a slave to the new master (former slave). The conventional switch involves a TDD (Time Division Duplex) switch so that the master and slave switch their TX (transmission) and RX (receiving) timing. The piconet 38 for the former master is based on piconet parameters derived from the AP device address 52 and clock of the former master. The conventional MSS switch leads to a newly defined piconet 38 based on piconet parameters derived from the AP device address 52 and clock of the new master.

The Bluetooth baseband specification version 1.0 B (available from Bluetooth SIG, Inc.), describes a conventional MSS in Section 10.9.3, "Master-slave switch." For this discussion, the slave in the original piconet 38 is unit "A" and the master in the original piconet 38 is unit "B" In summary, the conventional procedure for a MSS switch involves:

1. The two units (slave A and master B) agree to trade roles so that unit A will be master and B will be slave.
2. Slave A and master B perform a TDD switch between the slave A and master B while retaining (temporarily) the hopping scheme of master B (i.e., spread-spectrum frequency hopping).
3. Master A sends a LMP (Link Manager protocol) timing packet to slave B to be used in synchronizing the timing of transmissions between master A and slave B.
4. Master A establishes new channel parameters for a new piconet 38 (including master A and slave B) based on new piconet parameters derived from the address 52 and clock of master A.
5. Master A communicates the new piconet parameters to each slave in the former piconet 38.
6. Master A verifies the switch of the slaves to the new piconet 38 based on the new piconet parameters.

Using the techniques of the present invention, it is possible to use this master-slave switch to facilitate a seamless handoff of a mobile device 26 between two access points 24 without requiring any additional software in the mobile device 26.

Figure 6:
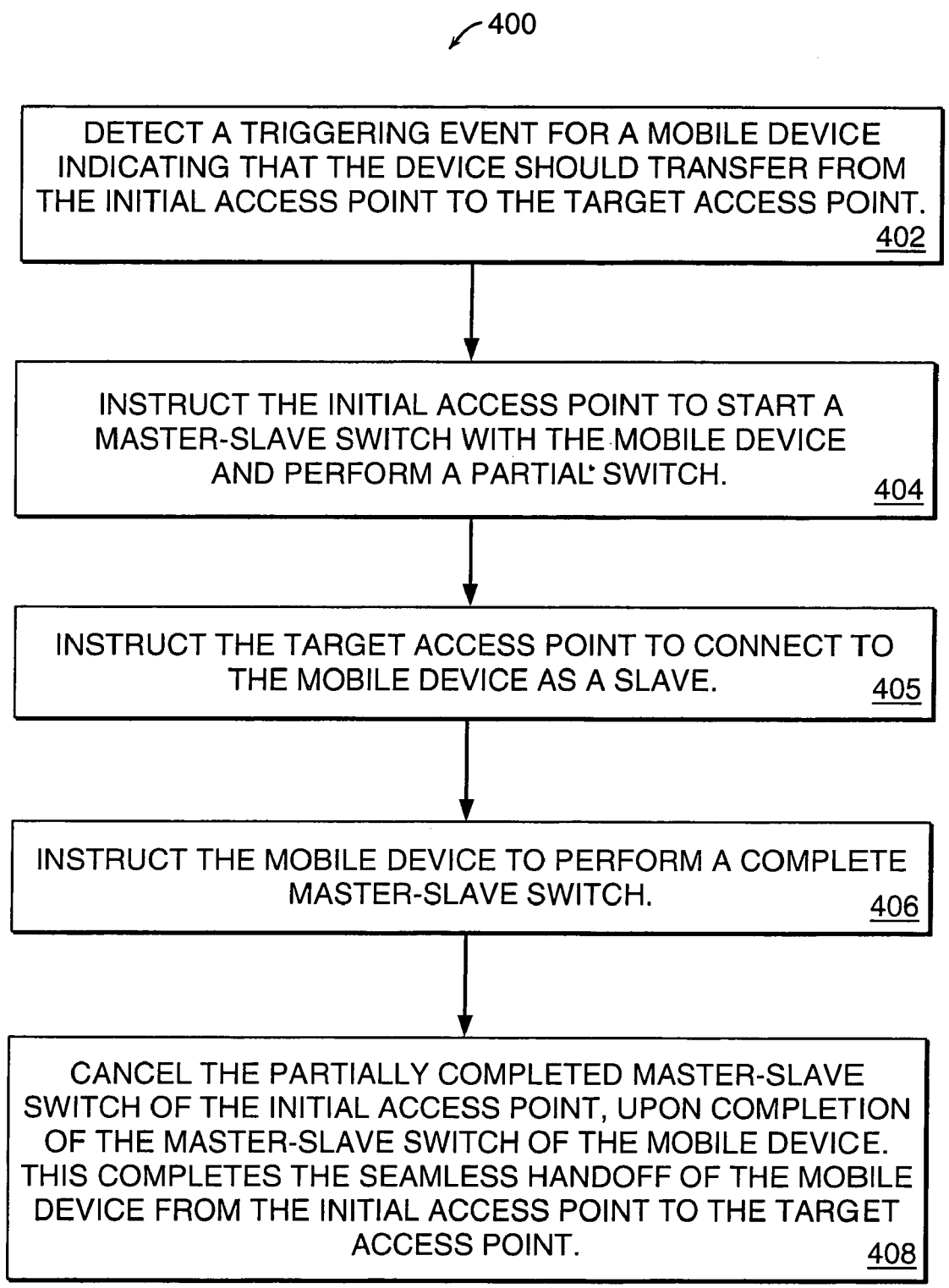
FIG. 6 is a flow chart of a procedure for a master/slave switch of the present invention.

Referring to FIG. 5, access points 24-6 and 24-7 are controlled by a common roaming server 22. Initial access point 24-6 is the master of piconet A, and target access point 24-7 is the master of piconet B (see relationships 302 and 304 in FIG. 5). In one embodiment, piconet A and piconet B are examples of piconet 38 of FIG. 1. FIG. 6 is a flow chart illustrating a procedure 400 for a master-slave switch of the present invention. In step 402, the roaming server 22 detects a triggering event for mobile device 26-6, which is currently a slave to initial access point 24-6, indicating that the mobile device 26-6 should transfer from the initial access point 24-6 to the target access point 24-7. For example, mobile device 26-6 is moving beyond range as determined by virtue of increased packet loss. In this example, the roaming server 22 also detects that mobile device 26-6 has moved within range of target access point 24-7 as its device identifier (e.g., Bluetooth address) can be heard by target access point 24-7 on enquiry logical channel. As a result, the roaming server 22 desires to move mobile device 26-6 from initial access point 24-6 to target access point 24-7. At this point, the target access point 24-7 is a master in piconet B, and the mobile device 26-6 is still a slave in piconet A (see relationship 304 in FIG. 5).

In step 404 (FIG. 6) the roaming server 22 achieves the transfer by instructing the initial access point 24-6 to start a master-slave switch with mobile device 26-6 and perform a partial switch. It follows step 1) and step 2) of the above summarized conventional procedure for a MSS, but then stops, so mobile device 26-6 is now master of piconet A (as illustrated by relationship 306 in FIG. 5) but all the devices are still following the hop pattern and offset of initial access point 24-6.

The target access point 24-7 can be the master of piconet B at the same time it is the slave of another piconet (e.g., piconet A). In step 405, the roaming server 22 instructs the target access point 24-7 to connect to mobile device 26-6 as a slave. At this point, mobile device 26-6 is the master of piconet A that includes target access point 24-7 as one of the slaves (see relationship 308 in FIG. 5).

In step 406 (FIG. 6), the target access point 24-7 then instructs mobile device 26-6 to perform a complete master-slave switch.

Upon completion of the master-slave switch, in step 408, the initial access point 24-6 cancels its partially completed master-slave switch so it returns to being master of piconet A. This does not change the piconet parameters for piconet A which is still following a hop sequence based on AP device address 52 of the initial access point 24-6. Mobile device 26-6 cannot follow because it is now a slave of target access point 24-7 in piconet B (see relationship 310 in FIG. 5). Mobile device 26-6 is now following a hop pattern set by the AP device address 52 of target access point 24-7, so the mobile device 26-6 is part of piconet B.

As indicated by step 408 of FIG. 6, the seamless handoff of the mobile device 26-6 from the initial access point 24-6 (for piconet A) to the target access point 24-7 (for piconet B) is complete.

FIG. 7 is a block diagram of the communications interface 44 of FIG. 2 including a host controller interface (HCI) 60 and a packet encapsulation module 62. The host controller interface 60 is a conventional interface specified by the wireless technology (e.g., Bluetooth HCI) that enables a host (e.g., mobile device 26 or access point 24) to control the wireless technology link control hardware (e.g., Bluetooth link control hardware) that controls the radio transmission and reception, as well as digital signal processing, specified by the wireless technology protocol. The packet encapsulation module 62 is a software or hardware module configured according to the present invention to encapsulate host controller commands in a network based encapsulated packet 64. The encapsulated packet 64 includes host device address 66, sequence number 68, acknowledgment number 70, and the host controller command 72 (e.g., HCI command). In one embodiment, the host device address 66 is based on the AP device address 52 of FIG. 3.

In order to have effective control of access points 24 based on a wireless technology (Bluetooth, IEEE 802.11, ETSI HIPERLAN/2, or other wireless technology), it is necessary to transfer control of the access points 24 to a central roaming server 22. For ease of deployment this roaming server 22 needs be connected to the access points 24 via a standard LAN 34 using a protocol that can pass through routers. The techniques of the invention described for FIGS. 7, 8, and 9 apply to Bluetooth wireless networks as well as other wireless standards such as IEEE 802.11 and ETSI HIPERLAN/2.

In a preferred embodiment, UDP (User Datagram Protocol) packets include the encapsulated packets 64 of the present invention, which include HCI (Host Controller Interface) commands. These encapsulation techniques of the invention described herein for a preferred embodiment allows devices (e.g., access points 24) to be physically separate from the hosts (e.g., roaming servers 22) that implement the higher-level protocols. In the system described herein, this separation enables session roaming between access points 24, and forms an abstraction barrier between the non-standard baseband implementation and a conventional off-the-shelf implementation of the Bluetooth protocol stack.

Figure 8:
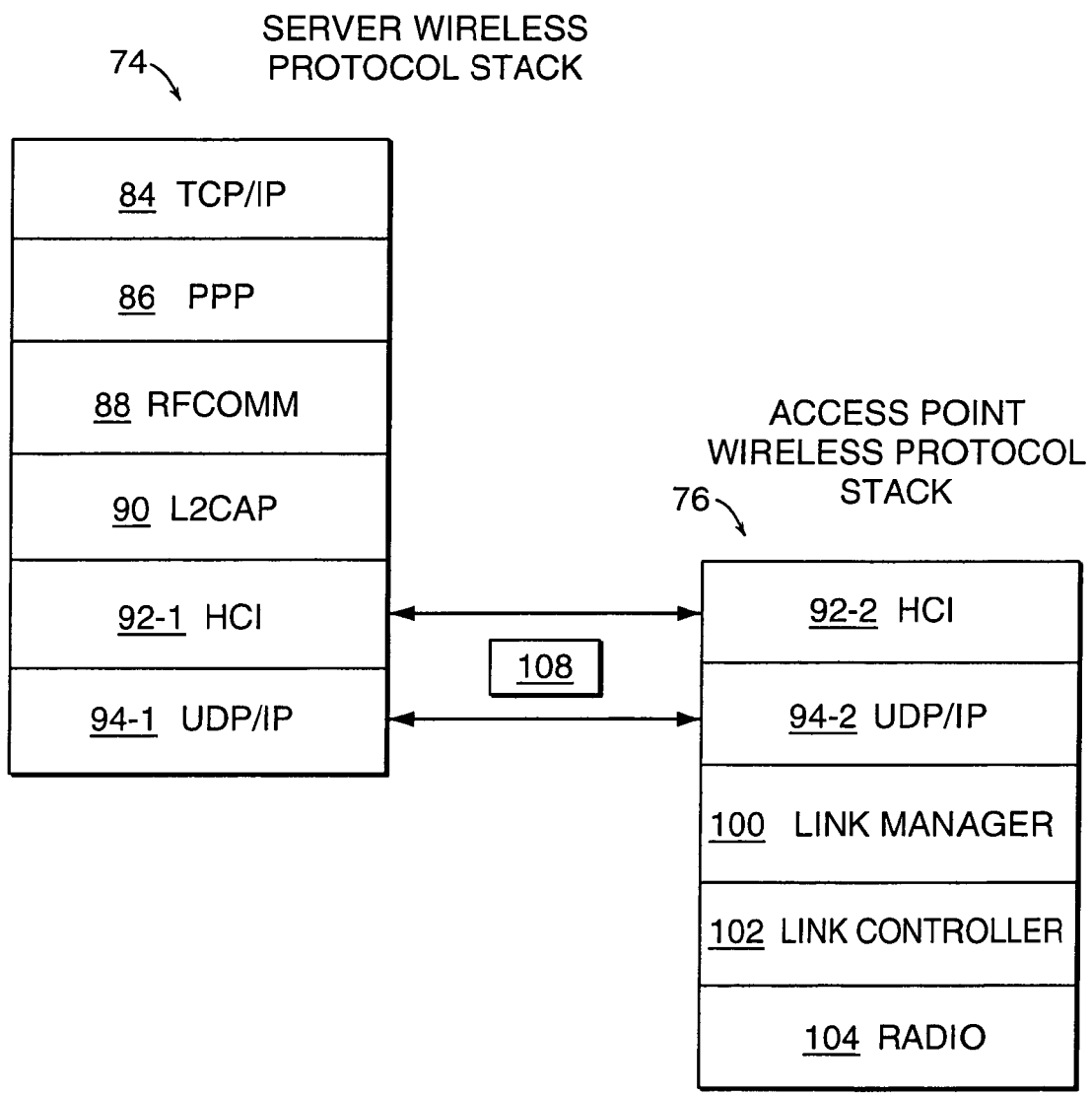
FIG. 8 is a block diagram of a server wireless protocol stack and an associated access point wireless protocol stack according to the present invention.

FIG. 8 is a block diagram of a server wireless protocol stack 74 and an associated complementary access point wireless protocol stack 76. The server wireless protocol stack 74 (for a roaming server 22 or master access point 24) includes the TCP/IP (Transmission Control Protocol/Internet Protocol) layer 84, the PPP (point to point) layer 86, the RFCOMM (serial cable emulation protocol) layer 88, the L2CAP (logical link controller adaptation protocol) layer 90, the HCI transport layer 92-1, and the UDP/IP (User Datagram Protocol/Internet Protocol) transport layer 94-1. The access point wireless protocol stack 76 includes the HCI transport layer 92-2, the UDP/IP transport layer 94-2, the link manager layer 100 (e.g., Bluetooth link manager), the link controller layer 102 (e.g., Bluetooth link controller), and the radio layer 104. An encapsulated packet signal 108 is a communications signal (e.g., over a LAN) that transports an encapsulated packet 64 between the server wireless protocol stack 74 and the access point wireless protocol stack 76. In particular, the encapsulated packet signal 108 (and hence encapsulated packet 64) is transported between stacks 74 and 76 at the HCI transport layer 92 and the UDP/IP transport layer 94. In another embodiment, the encapsulated packet signal 108 includes multiple encapsulated packets 64.

The advantage of UDP over TCP is a lower overhead and less delay caused by packet re-transmissions. The advantage of UDP encapsulation over Ethernet encapsulation is that the UDP-based packets easily pass through routers.

The splitting of the wireless protocol stack into two stacks 74 and 76, which includes encapsulation of host controller commands, (FIGS. 7, 8, and 9) represents one aspect of the invention. The present invention does not require that the wireless protocol stack be split in order to implement the session data transfer (AP device address spoofing) aspect of the present invention (FIGS. 3 and 4) and/or the master-slave switch aspect of the present invention (FIGS. 5 and 6). Furthermore, the session data transfer (AP device address spoofing) aspect of the present invention may be implemented without splitting of the wireless protocol stack or use of the master-slave switch. In one embodiment, the present invention provides for the implementation of both the session data transfer (AP device address spoofing) aspect of the present invention and the splitting of the wireless protocol stack aspect of the present invention.

FIG. 9 illustrates the HCI UDP packet format for an encapsulated packet 64 that includes a host controller interface command 72 (e.g., HCI command) based on a network based packet protocol (e.g., UDP). In FIG. 9, the encapsulated host controller command 72 is part of the payload 122 when UDP packets are used for the HCI transport layer.

The version field 112 is a 1-byte value that identifies the version of the packet format used. For the first version of the HCI UDP protocol, the value 0x01 is used.

The type field 114 specifies a 1-byte value that determines the interpretation of the payload 122. Values are defined in Table 1.

TABLE 1

| Packet Type | Packet Indicator |
| --- | --- |
| HCI Command | 0x01 |
| HCI ACL Data | 0x02 |
| HCI SCO Data | 0x03 |
| HCI Event | 0x04 |
| Session Control | 0x10 |
| ZLB | 0x11 |

The values 0x01 through 0x04 are interpreted as in the HCI UART Transport Layer (as described in the Bluetooth Core Specification version 1.0 B, available from Bluetooth SIG, Inc. (see also the www.bluetooth.com web site). The value 0x10 is for control messages related to session initiation and tear down. The value 0x11 is a Zero-Length Body (ZLB) message used for acknowledgments.

Continuing with FIG. 9, the BD_ADDR field 116 contains a host device address 66, such as a 48-bit Bluetooth device identifier, with the MSB being transmitted first. The BD_ADDR field 116 is shown as six 8-bit fields, 116-1, 116-2, 116-3, 116-4, 116-5, and 116-6 that together make up the 48-bit Bluetooth device identifier. The BD_ADDR identifies the host controller (e.g., access point 24 or roaming server 22) that is the source or destination of the encapsulated HCI packet 64.

The sequence number field 118 is an unsigned 16-bit integer field that contains a sequence number 68 used to ensure reliable, in-order delivery of encapsulated HCI packets 64. Its use is described later.

The acknowledgment number field 120 is an unsigned 16-bit integer field used to contain the acknowledgment number 70 to ensure reliable, in-order delivery of encapsulated HCI packets 64. Its use is described later.

Sequence numbers 68 and acknowledgment numbers 70 together provide reliable and sequenced transport of encapsulated HCI packets 64. The following description of the use of these numbers 68, 70 is based on the use of Nr and Ns fields in L2TP (Layer Two Tunneling Protocol) control packets. See Section 5.8, "Reliable Delivery of Control Messages" of RFC2661, "Layer Two Tunneling Protocol: L2TP", Internet Engineering Task Force, the entire teachings of which are incorporated herein by reference.

The sequence numbers 68 begin at a value of 0, and are incremented with the transmission of every encapsulated packet 64. The sequence counter is a free running counter represented modulo 65536. The sequence number 68 in the header of a received message is considered less than equal to the last received sequence number 68 if its value lies in the range of the last received sequence number 68 and the preceding 32767 values, inclusive. For example, if the last received sequence number 68 was 15, then messages with sequence numbers 68 with values of 0 through 15, as well as values 32784 through 65535, would be considered less than or equal. Such a message would be considered a duplicate of a message already received and ignored from processing. However, in order to ensure that all messages are acknowledged properly, receipt of duplicate messages is acknowledged. This acknowledgment may be either piggybacked on a message in queue, or sent explicitly through a ZLB acknowledgment.

All encapsulated packets 64 take up one slot in the sequence number space, except the ZLB acknowledgment. Thus the sequence number 68 is not incremented after a ZLB message is sent.

The acknowledgment number 70 is used to acknowledge messages received by the peer. It contains the sequence number 68 of the message the peer expects to receive next (e.g., the last sequence of a non-ZLB message received plus 1, modulo 65536). While the acknowledgment number 70 in a received ZLB is used to flush out messages from the local retransmit queue, the sequence number 68 of the ZLB does not update the acknowledgment number 70 of the next message sent.

In one embodiment, a sliding window is implemented in order to deal with random transmission time delays.

While this invention has been particularly shown and described with references to preferred embodiments thereof, it will be understood by those skilled in the art that various changes in form and details may be made therein without departing from the scope of the invention encompassed by the appended claims.

For example, the techniques of the present invention can be applied to wireless technologies and wireless communication protocols other than the Bluetooth technology, IEEE 802.11 technology, and the ETSI HIPERLAN/2 technology. In particular, the techniques of the present invention can be applied to other wireless technologies and protocols suitable for wireless communications among mobile devices 26 and network devices (e.g., access points 24).

What is claimed is:

1. A computer method for performing a seamless handoff of a mobile device from an initial access point to a target access point in a wireless local access network, comprising the steps of:
    assigning session data at a roaming server to the initial access point to establish an initial connection from the mobile device through the initial access point to the roaming server;
    detecting at the roaming server a triggering event that initiates a seamless transfer of the mobile device from the initial access point to the target access point; and
    seamlessly transferring at the roaming server assignment of the session data from the initial access point to the target access point to establish a target connection from the mobile device through the target access point to the roaming server based on the session data in response to the triggering event, thereby enabling the mobile device to use the session data to communicate with the roaming server in a continuous manner during the transfer.

2. The computer method of claim 1, wherein the step of detecting the triggering event comprises detecting that the mobile device is moving out of range of the initial access point and within range of the target access point.

3. The computer method of claim 1, wherein the step of detecting the triggering event comprises determining that the target access point has a preferable level of congestion compared to a level of congestion for the initial access point.

4. The computer method of claim 1, wherein the step of detecting the triggering event comprises determining that the target connection has a preferable level of connection quality compared to a level of connection quality for the initial connection.

5. The computer method of claim 1, wherein:
    the step of assigning the session data to the initial access point comprises assigning an access point device address to the initial access point; and
    the step of transferring assignment of the session data comprises terminating the assignment of the access point device address to the initial access point and assigning the access point device address to the target access point.

6. The computer method of claim 1, wherein:
    the initial connection is a first version of a point to point link between the initial access point and the mobile device based on assigning the access point device address to the initial access point; and
    the target connection is a second version of the point to point link based on assigning the access point device address to the target access point and re-establishing the point to point link between the target access point and the mobile device.

7. The computer method of claim 1, further comprising a step of registering the session data in a database.

8. The computer method of claim 1, wherein the session data comprises the access point device address and encryption data.

9. The computer method of claim 1, further comprising a step of assigning a mobile device address to the mobile device, and wherein the session data includes the access point device address and the mobile device address.

10. The computer method of claim 1, wherein the step of detecting the triggering event occurs in response to a transient situation affecting the initial access point; and further comprising a step of reassigning the session data to the initial access point to re-establish the initial connection after a termination of the transient situation.

11. The computer method of claim 10, wherein the transient situation is one of a congestion of the initial access point and a decline of connection quality in the initial connection.

12. A system comprising a digital processor for performing a seamless handoff of a mobile device from an initial access point to a target access point in wireless a local access network, the system comprising:
    a gateway application executing on a roaming server for assigning session data to the initial access point to establish an initial connection from the mobile device through the initial access point to the roaming server and seamlessly transferring assignment of the session data from the initial access point to the target access point to establish a target connection from the mobile device through the target access point to the roaming server based on the session data, thereby maintaining a continuous connection with the roaming server during the transfer; and
    a communications interface coupled with the gateway application for detecting the triggering event that initiates the transfer.

13. The system of claim 12, wherein the triggering event is based on roaming of the mobile device and wherein the communication interface detects that the mobile device is moving out of range of the initial access point and within range of the target access point.

14. The system of claim 12, wherein the triggering event is based on congestion in the wireless area network and wherein the communications interface determines that the target access point has a preferable level of congestion compared to a level of congestion for the initial access point.

15. The system of claim 12, wherein the triggering event is based on connection quality and wherein the communications interface determines that the target connection has a preferable level of connection quality compared to a level of connection quality for the initial connection.

16. The system of claim 12, wherein the session data includes an access point device address and the gateway application:
    assigns the session data to the initial access point by assigning the access point device address to the initial access point; and
    transfers the session data by terminating the assignment of the access point device address to the initial access point and by assigning the access point device address to the target access point.

17. The system of claim 12, wherein:
    the initial connection is a first version of a point to point link between the initial access point and the mobile device based on assigning the access point device address to the initial access point; and
    the target connection is a second version of the point to point link based on assigning the access point device address to the target access point and re-establishing the point to point link between the target access point and the mobile device.

18. The system of claim 12, wherein the gateway application registers the session data in a database.

19. The system of claim 12, wherein the session data comprises the access point device address and encryption data.

20. The system of claim 12, wherein the gateway application assigns a mobile device address to the mobile device, and wherein the session data includes the access point device address and the mobile device address.

21. The system of claim 12, wherein the communication interface detects the triggering event occurs in response to a transient situation affecting the initial access point; and
the gateway application reassigns the session data to the initial access point to re-establish the initial connection after a termination of the transient situation.

22. The system of claim 21, wherein the transient situation is one of a congestion of the initial access point and a decline of connection quality in the initial connection.

23. A computer program product that includes a computer usable medium having computer program instructions stored thereon for performing a seamless handoff of a mobile device from an initial access point to a target access point in a wireless local area network, such that the computer program instructions, when performed by a digital processor, cause the digital processor to:
assign session data to the initial access point to establish an initial connection from the mobile device through the initial access point to a roaming server;
detect a triggering event that initiates a seamless transfer of the mobile device from the initial access point to the target access point; and
transfer, at the roaming server, assignment of the session data from the initial access point to the target access point to establish a target connection from the mobile device through the target access point to the roaming server based on the session data in response to the triggering event, thereby enabling the mobile device to use the session data to maintain a continuous connection with the roaming server during the transfer.

24. A method for enabling seamless roaming of mobile devices among access points in a wireless local area network, comprising the steps of:
establishing a host controller interface in a roaming server;
encapsulating host controller commands in a packet-based network protocol for use in communication between the roaming server and access points in the wireless area network, the host controller commands directed to a connection session of the mobile device with the wireless local area network; and
exchanging the encapsulated host controller commands between access points in the wireless area network to enable a mobile device to receive the host controller commands from the roaming server and continuously maintain the connection session with the roaming server while roaming among the access points.

25. The method of claim 24, wherein the step of encapsulating the host controller commands comprises encapsulating each host controller command in an encapsulated packet based on the packet-based network protocol, and providing a device address of a host exchanging each encapsulated packet, a sequence number for use in a series of encapsulated packets, and an acknowledgment number for use in acknowledging a previously transmitted encapsulated packet.

26. The method of claim 24, wherein the packet-based network protocol is a user datagram protocol.

27. A roaming server comprising a digital processor for enabling seamless roaming of mobile devices among access points in a wireless area network, comprising:
a host controller interface established in the roaming server;
a packet encapsulation module executing on the digital processor for encapsulating host controller commands in a packet-based network protocol for use in communication between the roaming server and access points in the wireless area network, the host controller commands directed to a connection session of the mobile device with the wireless local area network; and
a communications interface coupled with the digital processor for exchanging the encapsulated host controller commands between access points in the wireless area network to enable a mobile device to receive the host controller commands from the roaming server and continuously maintain the connection session with the roaming server while roaming among the access points.

28. The roaming server of claim 27, wherein the packet encapsulation module encapsulates each host controller command in an encapsulated packet based on the packet-based network protocol, and the packet encapsulation module provides a device address of a host exchanging each encapsulated packet, a sequence number for use in a series of encapsulated packets, and an acknowledgment number for use in acknowledging a previously transmitted encapsulated packet.

29. The roaming server of claim 27, wherein the packet-based network protocol is a user datagram protocol.

30. A computer program product that includes a computer usable medium having computer program instructions stored thereon for enabling seamless roaming of mobile devices among access points in a wireless area network, such that the computer program instructions, when performed by a digital processor, cause the digital processor to:
establish a host controller interface in a roaming server;
encapsulate host controller commands in a packet-based network protocol for use in communication among the roaming server and access points in the wireless area network, the host controller commands directed to a connection session of the mobile device with the wireless local area network; and
exchange the encapsulated host controller commands between access points in the wireless area network to enable a mobile device to receive the host controller commands from the roaming server and continuously maintain the connection session with the roaming server while roaming among the access points.

* * * * *